Jan. 20, 1948.         T. J. MURPHY         2,434,671
ELECTRIC RECIPROCATING MOTOR
Filed July 24, 1944         4 Sheets-Sheet 2
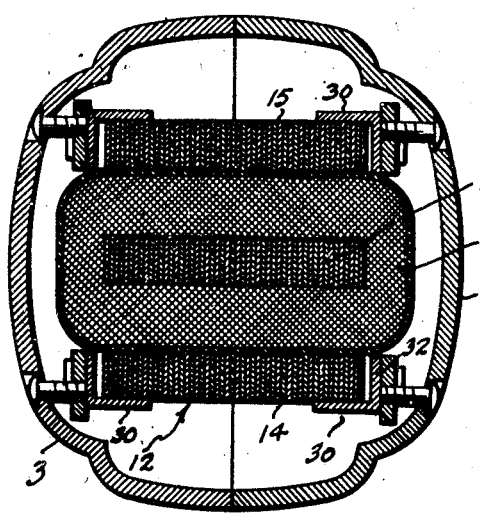
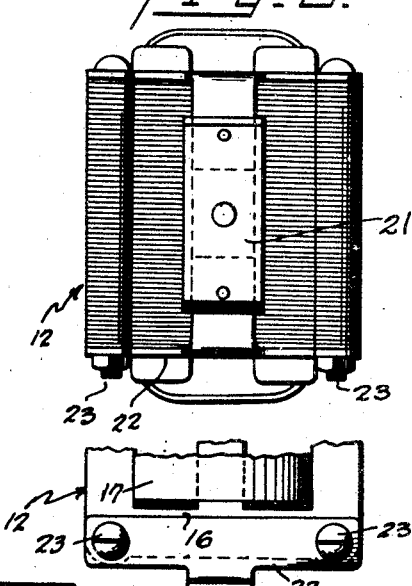
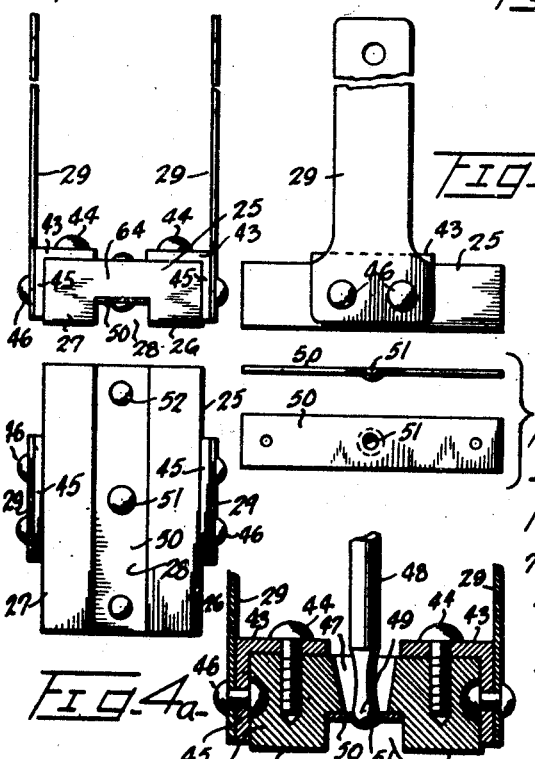
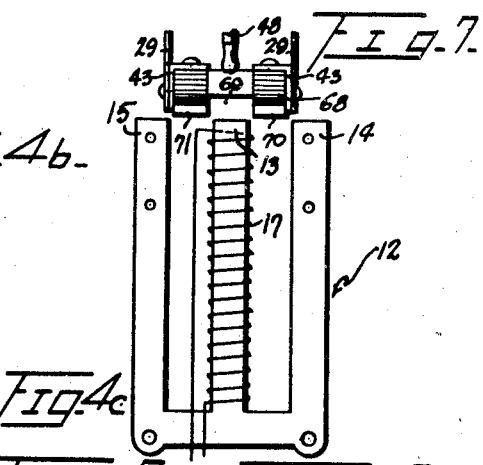
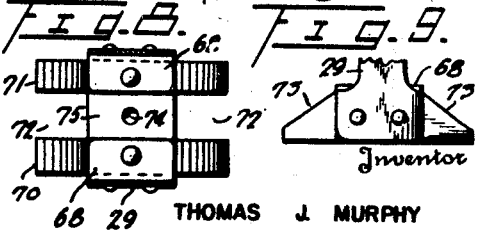
THOMAS J. MURPHY
Inventor

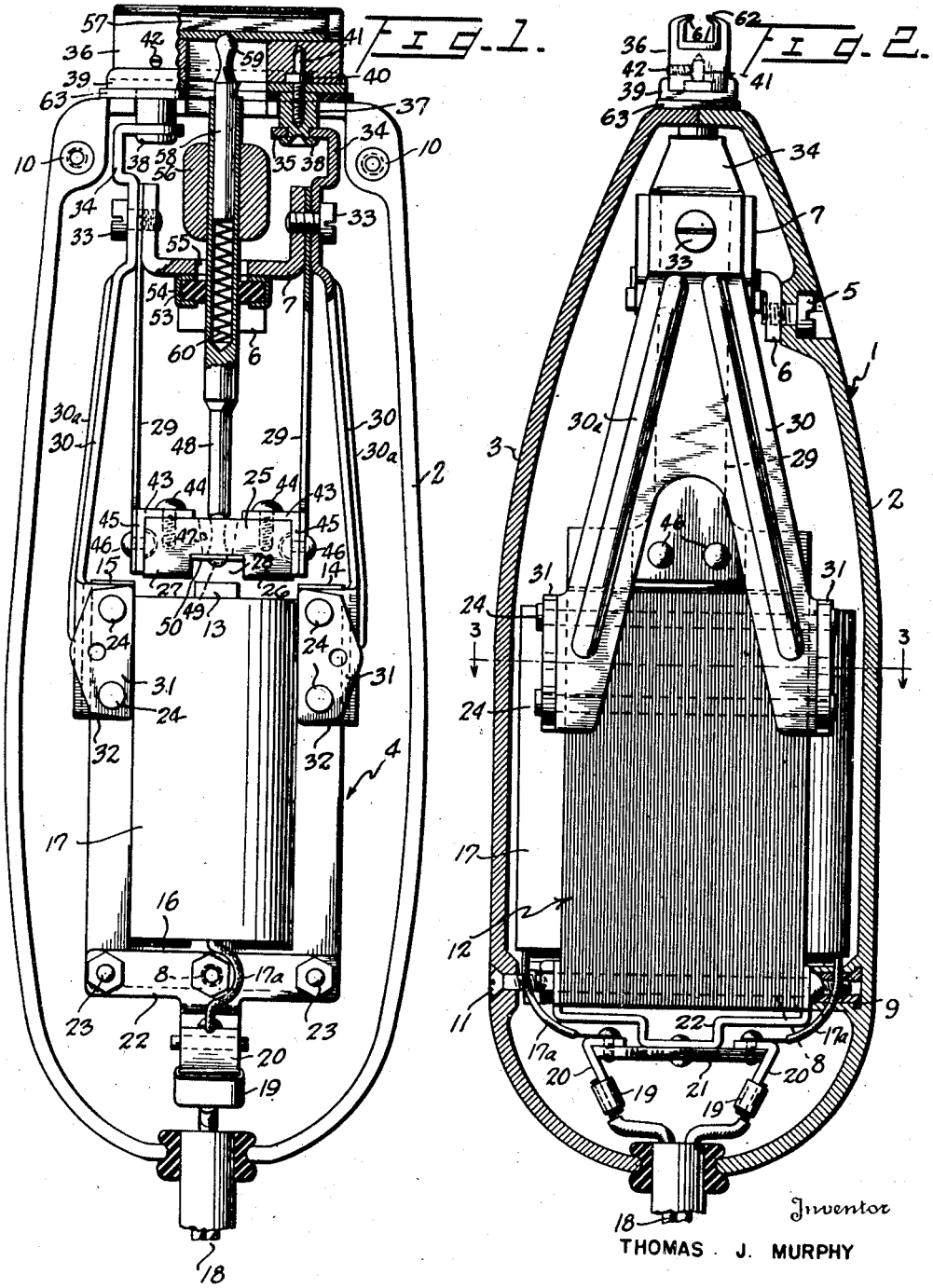

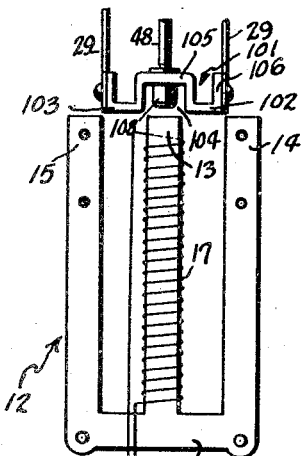
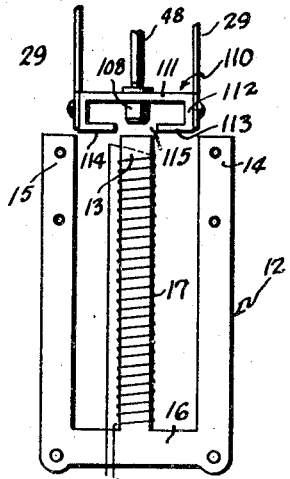
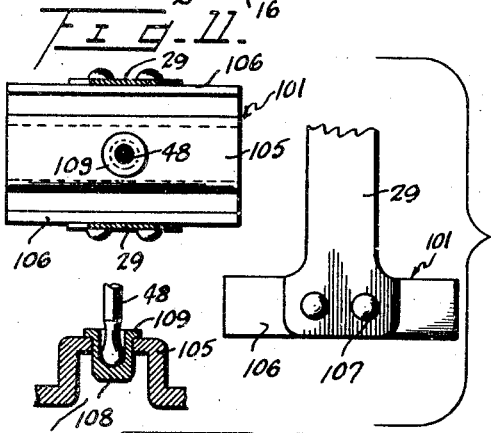
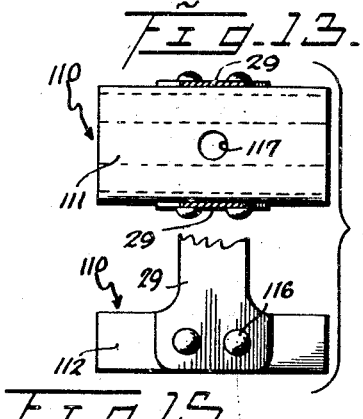
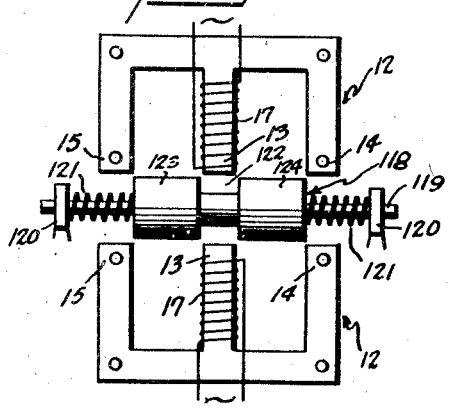
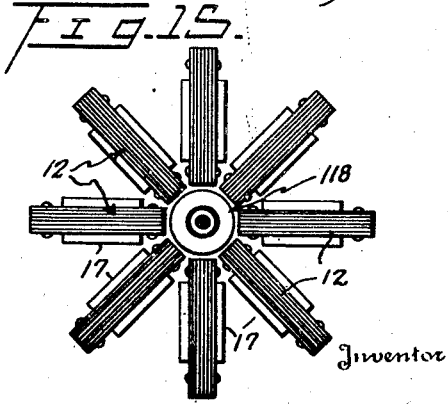
Inventor
THOMAS J. MURPHY

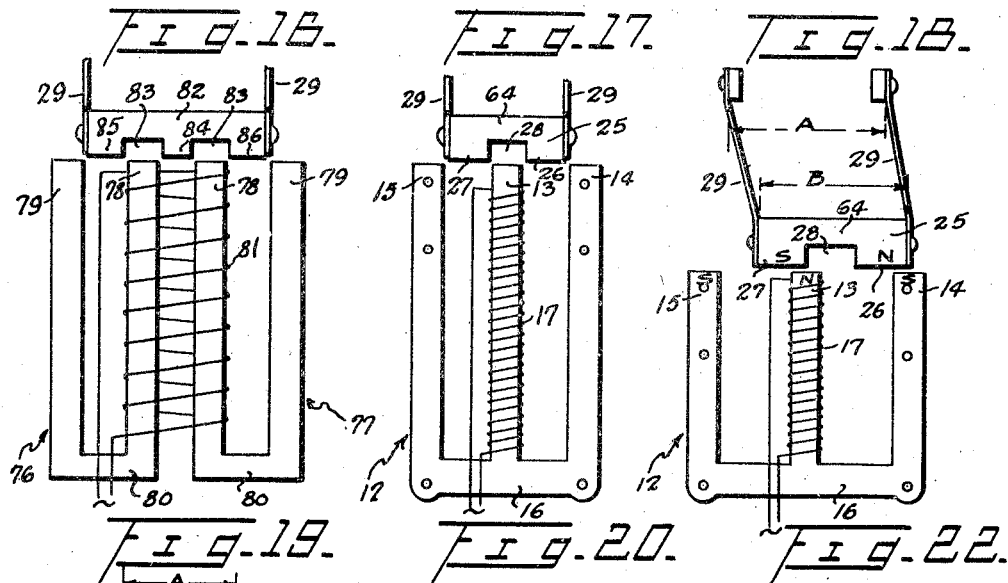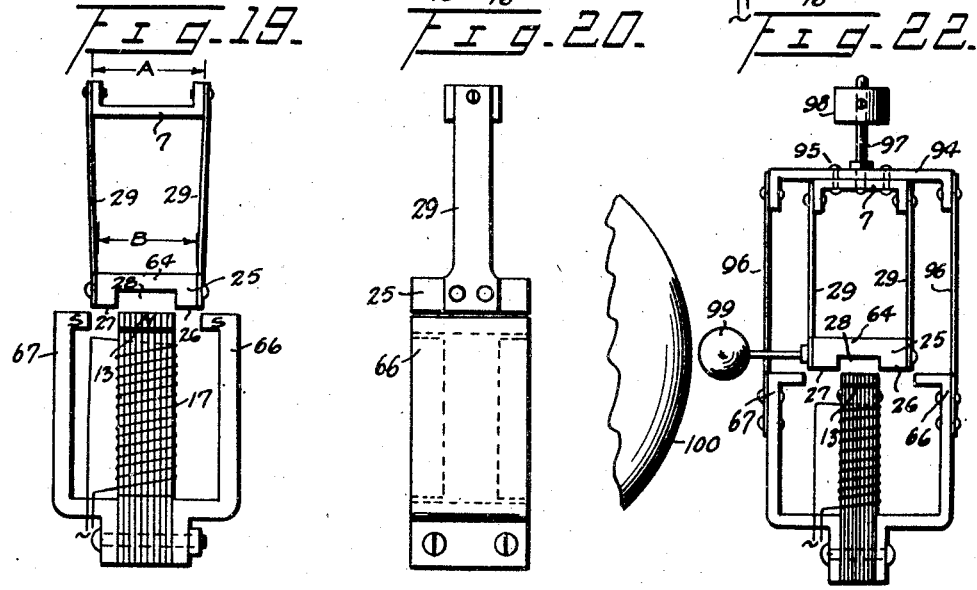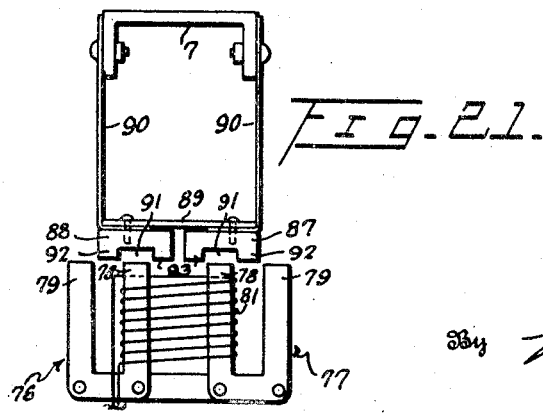

Patented Jan. 20, 1948

2,434,671

UNITED STATES PATENT OFFICE 2,434,671

ELECTRIC RECIPROCATING MOTOR

Thomas J. Murphy, Stamford, Conn.

Application July 24, 1944, Serial No. 546,277

18 Claims. (Cl. 172—126)

This invention relates to an electric reciprocating motor or electric activator, and has for a particular object to provide an improved construction and arrangement whereby greater power and a longer stroke can be secured over the usual constructions without increasing the amount of metals or other materials employed.

Another object is to provide an improved construction and arrangement of electric motor or activator for such devices as dry shavers and similar devices using a reciprocating armature in which there is no make and break of the circuit to cause arcing or interference with radios and similar devices.

It is a further object to provide an improved construction and arrangement for utilizing the reciprocating motion of the armature and transmitting it to the element to be operated.

With the foregoing and other objects in view I have devised the constructions illustrated in the accompanying drawings forming a part of this specification. It is, however, to be understood the invention is not limited to the specific details of construction and arrangement shown but may embody various changes and modifications within the scope of the invention.

In these drawings:

Fig. 1 is a side elevation of the device on an enlarged scale showing it applied to a dry shaver by way of example, one-half of the casing being removed to show the motor mechanism in elevation and certain parts being broken away to more clearly show the construction;

Fig. 2 is a view looking from the left of Fig. 1 showing the casing in section and the motor in elevation;

Fig. 3 is a transverse section substantially on the line 3—3 of Fig. 2;

Fig. 4 is an end elevation of the armature of Figs. 1 and 2;

Fig. 4a is a bottom plan view thereof;

Fig. 4b is a side elevation looking from the right of Fig. 4;

Fig. 4c is an edge view and top plan of a steel strip rest for the driving pin, part being broken away to show the construction;

Fig. 4d is a transverse section of the armature of Fig. 4;

Fig. 5 is a bottom plan view of the motor;

Fig. 6 is a side view of the lower end portion thereof;

Fig. 7 is a somewhat diagrammatical view showing a modified construction of armature;

Fig. 8 is a top plan view of the armature of Fig. 7;

Fig. 9 is a side view thereof looking from the right of Fig. 7;

Fig. 10 is a view similar to Fig. 7 showing another modified construction of armature;

Fig. 11 is a top plan view and side elevation and section through the center portion of the armature of Fig. 10;

Fig. 12 is a view similar to Fig. 10 showing another modified construction of armature;

Fig. 13 is a top plan view and side elevation of the armature shown in Fig. 12;

Fig. 14 is a diagrammatical view showing another modified arrangement;

Fig. 15 is an end view of the arrangement of Fig. 14;

Fig. 16 is a diagrammatical view showing a further modified arrangement;

Fig. 17 is a diagrammatical view showing the type of armature of Fig. 1 in its intermediate position;

Fig. 18 is a similar view showing the armature at the end of its movement in one direction;

Fig. 19 is a view similar to Figs. 16 to 18 showing a modified core construction;

Fig. 20 is an elevation looking from the right of Fig. 19;

Fig. 21 is a diagrammatical view showing still another modified arrangement, and Fig. 22 shows a still further modified arrangement applied to a gong.

Referring first to Figs. 1 to 6, the motor or activator is shown as applied to operation of a dry shaving head, but this is shown merely by way of example and it is to be understood the device is not limited to such use but is adapted for operating various devices. The motor is shown as mounted in a casing 1 of any suitable material such for example as molded plastic, and this casing is preferably of two separate halves 2 and 3 separable to give access to the motor for inspection or repairs and to assist assembly. The motor indicated as a whole at 4 is mounted within the casing and may be secured therein by means of a screw 5 threaded into an arm 6 of a spacer bracket 7. The lower end may be secured to the section 2 by a bolt 8 passing through the lower end of the motor threaded into insert 9 molded in the casing. The other half 3 may be secured to the first by screws (not shown) threaded into inserts 10 molded in the section 2 and a screw 11 threaded into the head of the bolt 8.

The motor itself comprises a laminated core 12 comprising three spaced legs forming spaced poles 13, 14 and 15 connected at their lower ends at 16, the center leg being embraced by an electric coil 17 connected through the leads 18 to any suitable source of alternating current supply through any suitable type of plug-in cap (not shown) adapted to be plugged into any standard outlet receptacle or plug connector. Leads 18 are connected by suitable clips 19 to connectors 20 mounted on an insulating member 21 which in turn is mounted on a suitable support 22 mounted on the lower end of the motor core by means of the bolt 8 and the bolts 23. The ends 17a of the coil 17 are connected to the connectors 20. It is preferred that the core, as shown in Fig. 2, be made up of a series of laminations of soft or proper magnetic iron and secured together by the bolts 23 and the rivets 24.

Mounted to reciprocate across the free ends or poles 13, 14 and 15 of the core is an improved armature 25 of suitable magnetic material such for example as soft iron, and this armature is substantially inverted U-shaped forming spaced poles 26 and 27. This armature may be formed from a block of the proper metal and provided with a transverse recess 28 which thus separates the poles 26 and 27. The armature is mounted on resilient supporting means tending to move it to an intermediate position with respect to the core poles 13, 14 and 15, substantially as shown in Fig. 1. In the present arrangement it is supported on two spaced flat supporting springs 29 carried by two side frame members 30. These frame members are mounted at their lower ends on the outer legs 14 and 15 of the core by means of the rivets 24 and there may be washers 31 between the heads of the rivets and the flanges 32. Each frame member as shown is of substantially inverted V-shape, as shown in Fig. 2, with the lower ends secured to the core 12 and the upper ends connected by the spacer bracket 7 which is shown in Fig. 1 as substantially U-shaped, and the frame members are secured to this bracket by screws 33. The same screws are used to mount the springs 29 the upper ends of which may be located between the frame members 30 and the upright side arms of the bracket 7. Longitudinal ribs 30a may be pressed in the frame members to strengthen and stiffen them. The upper ends of the frame members are offset outwardly somewhat as shown at 34 and then are bent inwardly horizontally as shown at 35 and on which is mounted the shaving head 36. The shaving head may be mounted on the frame in various ways but in the arrangement shown cylindrical spacers 37 have reduced end portions extending through openings in the end portions 35 and riveted over as shown at 38 to mount them on the frame members. The head 36 is seated in a channel shaped supporting member 39 which rests on the upper ends of the spacers 37 and is secured thereto by the securing screws 40 arranged with their heads on the top of the channel member and tapped into the spacers 37 as shown. These screws have extensions 41 at their upper ends extending into openings in the head of the block 36 with set screws 42 threaded into the side of the block and clamped against these extensions to mount the head in position.

The supporting springs 29 may be directly connected to the armature 25 at their lower ends, but preferably a pair of angularly shaped yokes 43 are secured to the armature with their upper legs resting on top of the armature and secured thereto by the screws 44, while the upright legs 45 are located against the end of the armature and are secured to the springs 29 by the rivets 46. This makes the pull of the armature longitudinally of the screws 44 instead of transversely as would be the case if the screws were passed through the springs into the ends of the armature. The armature is provided with a central opening 47 leading to the recess 28 for passage of the drive rod 48. This drive rod has a spherical shaped lower end 49 seating in a recess pressed into a supporting strip 50, as shown at 51, shown more clearly in Figs. 4c and 4d. This may be a steel strip secured to the armature by suitable rivets 52. This is preferably of steel, although it may be of other material if desired, as it could be of some hard plastic insulating material if it should be desired to insulate the drive rod.

This drive rod passes through a semi-hard rubber pad 53 forming a fulcrum for this rod which will yield slightly and which pad is mounted in a retainer 54 mounted on the spacer bracket 7, the bracket being provided with a sufficiently large opening 55 to provide clearance for the rod. The retainer could be secured to the bracket by any suitable means such for example as welding. Carried by the rod 48 above the fulcrum is a counterbalancing weight 56 which is slidable on the rod and after adjustment to the proper location may be soldered in position to counterbalance the armature and reduce vibration due to the reciprocating movement of the armature. It is preferred to so locate the weight that the armature and its spring supports 29 are tuned to substantially the frequency of the alternating current supplied to the coil 17. The drive rod is connected with the reciprocating cutter 57 of the dry shaver head by a drive pin 58 having sliding fit in the upper end of the drive rod 48, as shown in Fig. 1, and provided with a spherical upper end 59 seating in a recess in the under side of the cutter. A spring 60 mounted in the recess in the rod 48 tends to force the drive pin 58 outwardly and retain it in the recess in the cutter and also to press the teeth on the upper edge of the cutter, indicated at 61, against the under side of the stationary teeth 62 of the outer or stationary cutter to always insure good shearing action between the teeth. In order to reduce noise there may be a rubber pad 63 mounted between the general support 39 and the end of the casing 1.

It is preferred in the mounting for the armature that the upper ends of the supporting springs 29 be spaced a somewhat greater distance than the spacing of the lower ends which are secured to the armature so that as the armature reciprocates the outer ends will not be drawn away from the outer pole pieces 14 and 15 as much as they would be otherwise, and thus the armature is maintained in a closer relation to the core poles and the air gap between them is reduced, reducing the reluctance of the magnetic circuit, increasing efficiency and giving greater power. It will be evident from Fig. 1 that as the armature reciprocates right and left it will swing the lower end of the drive rod 48 back and forth about the fulcrum 53, which is yieldable slightly to prevent armature from stalling when latter is in dead center. Because of yieldable fulcrum, for small displacement of armature the true fulcrum is shifted to top of the drive pin, and consequently no work or load is put on movement of armature for small displacements. This will reciprocate the drive pin 58 which in turn through connection of its upper end to the movable cutter 57 will reciprocate this cutter for the shaving operation.

The armature is reciprocated across the core pole pieces as the flux therein is reversed by the coil 17 because of the alternating current passing through this coil. An important part of the present construction is the transverse cutaway portion or recess 28 in the armature which separates the two poles 26 and 27 by an air gap, although they are magnetically connected above this gap, as shown as 64. It has been found in actual tests in operation that this construction and arrangement gives greatly increased power over what would be secured with a straight armature without this recess. It is believed that it is caused by the multiple variable air gaps and polarization of armature. The depth of the recess may vary, but to secure this effect it should be sufficient to form an air gap to increase the reluctance between the poles of the armature so that the greater proportion of the flux instead of passing across this air gap will pass through the connecting body portion 64 and form a distinct magnetic pole at the opposite sides of the air gap. In other words, the depth of the recess need be only sufficient to make a substantial difference in reluctance over that of the gap between the pole tips and the adjacent faces of the armature.

It is also believed that with this arrangement, on reversal of the flux in the center leg 13 of the core there is very little reversal of flux in the outer legs 14 and 15. For example, in Fig. 18 the armature 25 is shown at one of its extreme positions. Now if we assume the center pole 13 north, pole 27 will be south, pole 26 north and pole 14 south. This is the position with the maximum current in the coil 17. As the current reduces to zero the springs 29 swing the armature backwardly or to the left and will carry the air gap beyond the central pole 13 as the current reverses in the coil, and on the other half of the cycle the central pole 13 will be south, but at this time the pole 26 has approached the pole 13 so that it will still remain north and the pole 27 has approached the other side pole 15, and as the pole 15 is now north, pole 27 remains south. There is therefore very little if any reversal of flux in the armature and there is no necessity for laminating this armature and the losses in the armature are reduced to a minimum. It will also be seen that as the armature is approaching the poles 13 and 15 at the time the current is reversed within the coil 17 and the polarity of central pole 13 is reversed the air gap between the pole 28 of the armature and the pole 14 of the core is increased to a maximum, increasing the reluctance of the magnetic circuit from central pole 13 to the armature and pole 14. It is therefore believed that the flux density in this circuit will be very low so that there would be practically no reversal of flux in the outer leg 14. The same would be true of the outer leg 15 on the other half of the cycle, and therefore it is believed that practically all the reversal of flux is in the center leg or pole 13. For this reason it is not necessary to laminate the outer poles or legs 15, as shown in Fig. 19. In this arrangement the center leg 65 may be laminated but the outer legs or poles 66 and 67 may be merely cold rolled stock or stampings, thus greatly reducing the cost of construction.

As suggested in connection with Fig. 1, it is preferred that the distance between the upper ends of the supporting springs 29, as shown at A in Fig. 18, be somewhat greater than the distance between the lower ends indicated at B, so that in the intermediate position of the armature these springs are inclined outwardly somewhat. The difference need not be great depending on the stroke of the armature. In such devices as ordinary dry shavers it may be about 1/16 of an inch greater. It will be seen that with this arrangement as the armature moves laterally the free end would not be drawn upwardly away from the core poles so quickly as would be the case were the distances the same, thus maintaining the armature in closer relation to the core poles and reducing the air gap, which tends to give a greater flux density because of reduced reluctance, and increasing the efficiency and power. It has been possible with this arrangement to effectively operate the device with the spacing between the poles of the core and armature of only .003 inch.

Different constructions and arrangements of the armature and also of the core may be employed. Thus for example in Figs. 7, 8 and 9, the armature 68 is provided with a transverse recess 69 corresponding to the recess 28 of Fig. 1 to form poles 70 and 71, but the metal is also cut away between the poles at their opposite ends, as shown at 72, and also the upper part of the poles may be tapered as shown at 73 to remove metal and lighten the armature and thus reduce vibration. The lower end of the drive rod 48 may rest directly in a recess 74 formed in the top of the connecting portion 75 between the poles.

In Fig. 16 is shown a modified arrangement in which there are two separate magnetic cores 76, 77 each having spaced legs forming poles 78, 79 connected at their lower ends at 80. The cores are preferably laminated and the exciting coil 81 connected with a source of alternating current embraces both the legs forming the poles 78. The armature 82 mounted on the supporting springs 29 reciprocates across the poles 78, 79 where it is provided with two transverse recesses 83 forming separate poles 84, 85 and 86 separated by these recesses and so arranged that in its intermediate position the pole 84 is between the poles 78 of the cores, the pole 85 is between the poles 78, 79 of one core, and the pole 86 is between the poles 78, 79 of the other core. This gives greatly increased power for the same amount of material, but the principle of operation is the same as described in connection with Fig. 1 and in Figs. 17 and 18.

In Fig. 21 there are the two separate cores 76 and 77 the same as in Fig. 16, with the two inner legs 78 embraced by the single coil 81, but instead of having the armature in one piece as in Fig. 16, there are two separate armatures 87 and 88 mounted on the single support 89 suspended from the flat springs 90 corresponding to the springs 29. Each armature is provided with a transverse recess 91 at its side next to the cores 76 and 77 providing spaced poles 92 and 93 separated by the recesses. Each armature cooperates with its respective core 76 and 77 in the manner previously described. There are thus two separate and distinct magnetic circuits excited by a single coil. This provides a very powerful arrangement compared with the amount of material employed, and one in which there is a minimum reversal of flux in both cores and armature.

In Fig. 22 is shown a modified arrangement for operating a gong or similar device. The core and exciting coil are the same as that shown in Fig. 19 and the armature 25 is supported by the spaced flat springs 29 depending from the supporting bracket 7. This bracket is mounted on another bracket 94 and the two brackets can be made of stampings and secured together by rivets 95. The upper bracket is somewhat wider than the bracket 7 and is supported by a similar flat springs 96 on the outer legs 66 and 67 of the core. An upright stud 97 carries a tuning weight 98 which may be adjusted on the stud and then secured in adjusted position by any suitable means such as a screw or soldering. The armature carries a hammer 99 adapted to strike the gong 100, but of course this arrangement is not confined to this sort of device but it may be used to operate numerous other devices. It was found by tests that this arrangement gave a strong stroke and long travel when used as an activator to operate a hammer or similar device. If the supporting arrangement 94 and the weight 98 is tuned to vibrate at substantially half the normal frequency of the armature 25, then the actual frequency of the hammer for a 60-cycle current is half that of the current, or that is 30 strokes per second, which is especially desirable for operating such devices as gongs and the like. This arrangement also greatly reduces the overall vertical dimensions over what would be required for a similar stroke of the previous arrangement.

In Figs. 10 and 11 is shown a modified construction of armature, although the core and exciter arrangement with a single coil 17 is the same as that of Fig. 1. In this case instead of the armature 101 being a solid block as in Fig. 1, it is formed of a strip of cold rolled steel of proper thickness shaped to form the spaced poles 102 and 103 reciprocating across the poles of the core 12 and separated by the transverse recess 104 forming an air space between them but magnetically connected by the central portion 105. The outer upwardly directed ends 106 are connected to the supporting flat springs 29 corresponding to the first form by any suitable means such as rivets 107. The connecting central portion 105 may have an opening therein in which is seated the cup 108 having a flange 109 to rest on the top of the connection and this cup forms a recess to seat the lower spherical end 49 of the drive rod 48. This cup may be of metal or other suitable material. If it is desired to insulate the armature from a ground should the lead wires to the coil break and come in contact with the metal parts, this may be made of some insulating material.

In Figs. 12 and 13 is shown still another modified form of armature. This armature 110 is also formed of a strip of cold rolled stock comprising a central connecting portion 111 with the opposite ends bent downwardly at 112 and then inwardly to form the poles 113 and 114 spaced by the transverse recess 115. The poles are magnetically connected by the connection 111 and they operate across the poles 13, 14 and 15 of the core the same as in the previous form, this armature being supported from the flat springs 29 by any suitable means such as the rivets 116. The connection 111 may have an opening 117 to receive the cup 108 for connecting with the drive rod 48 the same as in Fig. 10.

Both the armatures of Figs. 10 and 12 are of much lighter construction than would be a solid block, thus reducing vibration, and also as they are formed from a strip of rolled metal, metal is not wasted by cutting them away.

In Figs. 14 and 15 is shown a modified arrangement which may be used with this construction. In this arrangement three legged laminated cores 12 are arranged around a cylindrical armature 118, in the present case there being shown eight equally spaced about the armature. The armature is carried by a supporting rod 119 mounted to slide in suitable bearing supports 120 with springs 121 embracing these rods between the bearings and the armature and tending to move it to an intermediate position with respect to the core poles. The armature is provided with an annular groove 122 corresponding to the recess 28 of the form of Figs. 1, 17 and 18, forming two spaced poles 123 and 124 corresponding to the poles 27 and 28. This operates on the same principle as the arrangement of Figs. 1, 17 and 18, but as the armature is cylindrical, a plurality of the three-legged exciting cores can be placed about the armature and thus add their effect to increase the power of the armature. The exciting coils 17 of these individual cores are each connected to a source of alternating current and they may be connected either in series or parallel.

It has been found with the above arrangements that much greater power is secured with the same amount of material and the device can therefore be built smaller and lighter for the same power. The device operates quietly and can be balanced to reduce vibration to a minimum. As there is no make and break of the circuit there is no arcing and no interference with radio and similar devices.

Having thus set forth the nature of my invention, what I claim is:

1. A motor of the character described comprising a core including two separate magnetic circuits formed by two substantially U-shaped core members each having connected legs forming spaced poles at their free ends, a movable support, a pair of separate armatures carried by the support one for each core member adjacent the spaced poles of the respective members, each armature comprising spaced magnetically connected poles separated by an air gap, an alternating current coil embracing a leg of both core members, and resilient means tending to move the armatures to an operative position with respect to the poles of the core members.

2. A motor of the character described comprising two separate core members each including a pair of spaced legs connected at one end and providing spaced poles at their free ends, an alternating current coil embracing the adjacent legs of the two members, a movable support, a pair of separate armatures carried by said support one adjacent and bridging the poles of each core member and movable across said poles, each armature comprising spaced poles separated by a transverse recess, and resilient means tending to move the armature to an intermediate position with respect to the core poles.

3. An activator of the character described comprising a core including three connected spaced legs forming spaced poles, a coil adapted for connection to an alternating current supply embracing the center leg, an armature closely adjacent the poles and movable transversely thereof, a pair of upright spring supports connected one to each of the opposite ends of the armature, a support for the upper ends of the spring supports and the upper ends of said upright supports being spaced a somewhat greater distance than their lower ends.

4. A motor of the character described comprising two core members each including a pair of spaced legs connected at one end and providing spaced poles at their free ends, an alternating current coil embracing the adjacent legs of the two members, an armature mounted adjacent the free ends of said leg members and movable across said poles, said armature including three spaced poles adjacent the core poles with the center pole spaced from each of the outer poles by a transverse recess, and resilient means tending to move the armature to an intermediate position with respect to the cores.

5. A device of the character described comprising a core including three spaced connected legs forming spaced poles, an alternating current coil embracing the central leg, an armature mounted adjacent said poles and movable across them, upright spaced supporting spring members connected to the armature, a support from which said spring members are suspended at their upper ends, a second pair of upright spring members outside the first members connected at their lower ends with the core member and at their upper ends to said support to support it, a counterbalance weight carried by said support, and means connected with the armature for operation thereby.

6. A device of the character described comprising a core including three spaced connected legs forming spaced poles, an alternating current coil embracing the central leg, an armature mounted adjacent said poles and movable across them, upright supports connected to the outer legs, a bracket secured between said supports adjacent their upper ends, a pair of spaced depending spring members connected with said bracket and the armature and spaced a greater distance at their upper ends connected to the bracket than at their lower ends connected to the armature, means to be operated by the armature, and a driving connection from the armature to said means.

7. A device of the character described comprising a core including spaced outer legs and an intermediate leg between them forming two magnetic circuits each including spaced poles, an alternating current coil embracing the intermediate leg, an armature mounted to move across said poles alternately from one magnetic circuit to the other, spaced upright supports secured to the respective outer poles, a bracket mounted between said supports adjacent their upper ends, spaced depending spring members connected with the bracket and the armature to support the armature, a driving connection from the armature extending through the bracket, and a fulcrum for said connection carried by the bracket.

8. A device of the character described comprising a core including spaced outer legs and an intermediate leg between them forming spaced poles, an alternating current coil embracing the intermediate leg, an armature mounted to move across said poles, a pair of upright supports secured to the outer legs, a bracket mounted between said supports adjacent their upper ends, a pair of spaced depending spring members connected with the bracket at their upper ends and the armature at their lower ends to support the armature, a semi-hard resilient rubber pad carried by the bracket between said spring members, and a driving rod connected with the armature between the spring members and extending through said pad so that the pad forms a fulcrum for the rod.

9. A device of the character described comprising a core including spaced outer legs and an intermediate leg between them forming spaced poles, alternating current windings to magnetize the legs, an armature mounted to move across said poles, a pair of upright supports secured to the outer legs, a bracket mounted between said supports adjacent their upper ends, a pair of depending spring members connected with the bracket at their upper ends and the armature at their lower ends to support the armature, a semi-hard resilient rubber pad carried by the bracket, a drive rod connected with the armature and extending through said pad so that the pad forms a fulcrum for the rod, and a counterbalance weight mounted on the rod above the pad.

10. A device of the character described comprising a core including spaced legs forming spaced poles, alternating current windings arranged to energize the core, an armature arranged to move across said poles, spaced upright supports secured to the legs, spaced depending spring supports connected at their lower ends to the armature and carried by said first supports, the upper ends of the said spring supports being spaced a somewhat greater distance than their lower ends, a drive rod connected with the armature, a semi-hard resilient rubber pad embracing the rod and forming a fulcrum for it, and means for supporting the pad.

11. A device of the character described comprising a core including spaced legs forming spaced poles, an alternating current coil arranged to energize the core, an armature arranged to move across said poles, upright supports secured to the legs, spaced depending spring supports connected at their lower ends to the armature and carried by said supports and tending to move the armature to an intermediate position, a drive rod connected with the armature between the spring supports, a semi-hard resilient rubber pad above the armature through which the rod extends and forming a fulcrum for said rod, means for supporting the pad, and a tuning weight carried by the rod above the pad.

12. An activator of the character described comprising a core including spaced magnetic poles, an armature closely adjacent the poles and movable transversely thereof, means for magnetizing the poles to reciprocate the armature, a pair of upright spring supports connected to the armature each adjacent one of the opposite ends thereof, a support for the upper ends of said upright supports and the upper ends of said upright supports being spaced a somewhat greater distance than their lower ends.

13. An activator of the character described comprising two magnetic circuits each including spaced magnetic poles of different polarity, alternating current means for magnetizing the poles, and an inductively polarized armature closely adjacent the pole tips whereby it is inductively polarized by the electrically magnetized poles, said armature being movable transversely of the pole tips alternately from one magnetic circuit to the other and comprising a pair of spaced poles with a gap between them and magnetically connected on the opposite side of the gap from the first poles, and resilient means tending to move the armature to position its poles in an intermediate position with respect to the poles of the respective magnetic circuits once per alternation of the impressed frequency.

14. An activator of the character described comprising a core including three connected spaced legs forming two magnetic circuits each including spaced poles, windings adapted for connection to an alternating current supply for magnetizing the legs, an inductively polarized armature closely adjacent the poles whereby it is inductively polarized by the electrically magnetized poles, said armature being movable transversely of the latter poles alternately from one magnetic circuit to the other, said armature comprising a pair of connected poles at its ends and provided with a transverse recess intermediate these poles on the side toward the core poles to form a space between the armature poles, and resilient means tending to move the armature to position its poles in an intermediate position relative to the core poles of the respective magnetic circuits.

15. An activator of the character described comprising a core including spaced connected legs forming different magnetic circuits and spaced poles at their free ends in each circuit, alternating current windings for exciting said legs, an inductively polarized armature adjacent said core poles whereby it is inductively polarized by the electrically magnetized poles and mounted to move across said poles alternately from one magnetic circuit to the other, said armature including spaced poles separated by a transverse recess, and resilient means tending to move the armature poles to an intermediate position relative to the core poles of the respective magnetic circuits against action of the core.

16. A device of the character described comprising a core including three spaced legs forming different magnetic circuits each including spaced poles, an alternating current coil embracing the center leg, an inductively polarized armature movable across said poles alternately from one magnetic circuit to the other and closely adjacent said poles whereby it is inductively polarized by the electrically magnetized poles, said armature comprising spaced poles separated by a transverse recess of sufficient depth to cause a substantial difference in reluctance over the gap between the core pole tips and the adjacent faces of the armature poles, and resilient means tending to move the armature to position its poles in an intermediate position with respect to the poles of the respective magnetic circuits.

17. A device of the character described comprising a core including spaced legs forming different magnetic circuits each including spaced magnetic poles, alternating current windings arranged to energize the core, an inductively polarized armature movable across said poles alternately from one magnetic circuit to the other and closely adjacent said poles whereby it is inductively polarized by the electrically magnetized poles, said armature comprising spaced poles separated by a transverse recess of sufficient depth to cause a substantial increase in reluctance over the gap between the core poles and the adjacent faces of the armature poles, and resilient means tending to move the armature to an intermediate position.

18. In combination, a reciprocable inductively polarized armature reduced in cross section at its center so that it comprises spaced poles separated by an air gap, magnetic poles on opposite side thereof in different magnetic circuits, means for positioning said armature between the magnetic poles to permit it to periodically close the magnetic circuit of opposite poles alternately, alternating current windings for magnetizing the second mentioned poles, said armature poles being movable across the latter poles alternately from one magnetic circuit to the other and closely adjacent said poles whereby the armature is inductively polarized by the electrically magnetized poles, and the armature positioning means being tuned to substantially the frequency of the impressed alternating current so that said armature makes a complete to and fro movement but once per cycle of the alternating current.

THOMAS J. MURPHY.

REFERENCES CITED

The following references are of record in the file of this patent:

UNITED STATES PATENTS

| Number | Name | Date |
| --- | --- | --- |
| 1,965,382 | Klug | July 3, 1934 |
| 2,185,683 | Barrett | Jan. 2, 1940 |
| 2,238,390 | Knopp | Apr. 15, 1941 |
| 2,239,931 | Prescott | Apr. 29, 1941 |
| 2,259,131 | Fleischer | Oct. 14, 1941 |
| 2,288,203 | Murphy | June 30, 1942 |
| 2,344,928 | Wheeler | Mar. 21, 1944 |